United States Patent [19]

Behn et al.

[11] 4,379,182

[45] Apr. 5, 1983

[54] METHOD OF MAKING A REGENERABLE ELECTRIC LAYER CAPACITOR

[75] Inventors: Reinhard Behn, Munich; Horst Pachonik, Taufkirchen; Gerhard Seebacher, Munich, all of Fed. Rep. of Germany

[73] Assignee: Siemens Aktiengesellschaft, Berlin & Munich, Fed. Rep. of Germany

[21] Appl. No.: 319,938

[22] Filed: Nov. 10, 1981

Related U.S. Application Data

[63] Continuation of Ser. No. 123,890, Feb. 22, 1980, abandoned.

[30] Foreign Application Priority Data

Mar. 5, 1979 [DE] Fed. Rep. of Germany ....... 2908467

[51] Int. Cl.³ .......................... B05D 3/06; C23C 11/00
[52] U.S. Cl. ..................................... 427/41; 29/25.42; 427/79

[58] Field of Search .................. 29/25.42; 427/41, 79, 427/80, 81; 361/273

[56] References Cited

U.S. PATENT DOCUMENTS 3,330,696  7/1967  Ullery, Jr. et al. ............... 427/79 X
4,153,925  5/1979  Gazard et al. ..................... 427/41 X Primary Examiner—Carl E. Hall
Attorney, Agent, or Firm—Hill, Van Santen, Steadman, Chiara & Simpson

[57] ABSTRACT

A layer capacitor is disclosed having at least two oppositely polarized metallizations and an intervening dielectric layer consisting of a glow polymerization arranged on a substrate. During production these layers are laterally defined by only one diaphragm. In order to make as great a use of the substrate surface and a rectangular shape of the component as possible, neighboring layers are designed of equal area and are applied in parallel diagonally offset to the edges of the diaphragm aperture.

1 Claim, 2 Drawing Figures

METHOD OF MAKING A REGENERABLE ELECTRIC LAYER CAPACITOR

This is a continuation of application Ser. No. 123,890, filed Feb. 22, 1980, now abandoned.

BACKGROUND OF THE INVENTION

The invention relates to a regenerable electric layer capacitor in which at least two opposite polarity metal layers and a dielectric layer consisting of a glow (gas discharge) polymerization are applied to a substrate. The metal layers and the dielectric layer are of equal coverage, are designed in the form of a parallelogram and are applied laterally offset with respect to one another. The respective metal layers of each polarity are contacted at two edges lying opposite one another along contact strips.

Such a capacitor is already known. In this capacitor, two anti-polar metallizations lie above one another with identical edges and are separated from one another only by means of a dielectric layer. Accordingly, flash-overs arise in the area of the edges and, although they are healed due to the regenerability of the coatings, a relatively broad strip of the coatings is destroyed before a sufficient insulation is produced.

Moreover, the dielectric layers fundamentally exhibit a weakening in the area of their lateral boundaries, this weakening not being avoidable in the manufacturing processes for glow polymerization layers known up to now.

It is already known from German Utility Model 1,965,296, incorporated herein by reference, to design such layers in a trapezoid shape and to arrange them offset in the direction perpendicular to the mutually parallel sides of the trapezoid. Such a capacitor, however of necessity makes relatively little use of the surface of the substrate, since, on the one hand, given a small deviation of the trapezoid from the rectangular shape, a relatively large mutual displacement of the individual layers is required in order to obtain the required insulating strip at the diagonal trapezoid sides. On the other hand, given a great deviation from the rectangular shape, the contacting at the shorter of the mutually parallel edges of the trapezoid which, by so doing become very short, becomes problematic. If, on the other hand, the interval between the mutually parallel trapezoid edges is selected so as to be very small in order to assure sufficient contacting, then the width of the contact strip already becomes considerable in comparison to the capacitively effective width. Again, a very low exploitation of the substrate surface results.

If such capacitors are to be sold individually, i.e. are not to be integrated in film circuits, then, for reasons of fabrication technology, one strives to see that two opposite sides of the component are respectively parallel to one another so that the separating device can be simply designed. Given a capacitor according to the prior art, this leads to a further reduction of the substrate surface used.

SUMMARY OF THE INVENTION

An object underlying the present invention is to provide an extensive exploitation of the substrate surface for the capacitively effective area of a capacitor of the type described above.

This object is achieved since each of the parallelogram dielectric or, respectively, metal layers is offset in parallel with respect to the immediately adjacent metal or, respectively dielectric layers in a direction which is parallel to none of the edges of the layers.

For contacting the coatings along opposite contact strips, it is advantageous that the offset component perpendicular to the contact strips is greater than the offset component parallel to the contact strips.

Advantageously, the dielectric layers and the metal layers are designed in rectangular fashion. Given relatively narrow contact strips, quadratic layers are particularly suited. For rectangular or, respectively, for the specific case of square layers, it is advantageous when the offset component perpendicular to the contact strip amounts to approximately 200 $\mu$m and the offset component parallel to the contact strips amounts to approximately 100 $\mu$m.

The offset component parallel to the contact strips takes into consideration the thickness decrease of the glow-polymer marginal layer. In addition to the thickness decrease, the offset component perpendicular to the contact strips takes into consideration the width required for the attachment of connection elements or, respectively, contact layers and the tolerance of the interval between the two connection elements or, respectively, contact layers. The respectively projecting part of the metal layers is available for this purpose. If the width of this is not sufficient, then the contact strip must be shaped more broadly than is required for the thickness decrease.

An inventive capacitor is advantageously manufactured by means of a method in which only one diaphragm with a parallelogram-shaped diaphragm aperture is employed and is laterally displaced with respect to a substrate to be coated between the manufacture of two successive layers. With this method, the diaphragm is brought into contact with the substrate or, respectively, the uppermost layer situated on the substrate at least before the manufacture of the glow-polymerization layers. The diaphragm is moved away from the substrate after coating in a direction which is parallel to none of the edges of the diaphragm aperture, is displaced parallel with respect to the substrate, and is again brought into contact with the substrate or, respectively, the layer situated at the top.

The employment of only one diaphragm makes possible the application of layers of equal coverage. Lifting off before displacement of the diaphragm is necessary so that the layers already applied are not damaged by the diaphragm when it is displaced. Given a multitude of applied layers, an increase of the capacitively effective area arises in comparison to its environment. The diaphragm, therefore, is moved away from the substrate by an amount which is greater than the overall thickness of the layers already applied.

Identical layers arranged precisely above one another are achieved in that the diaphragm is brought into three specific positions in the appropriate sequence. Of these three positions, one is respectively allocated to the metal layers of one polarity and the third is allocated to all dielectric layers. The sequence according to which the individual positions are assumed is determined in accord with the layer sequence to be applied.

DESCRIPTION OF THE PREFERRED EMBODIMENTS

Figure 1:
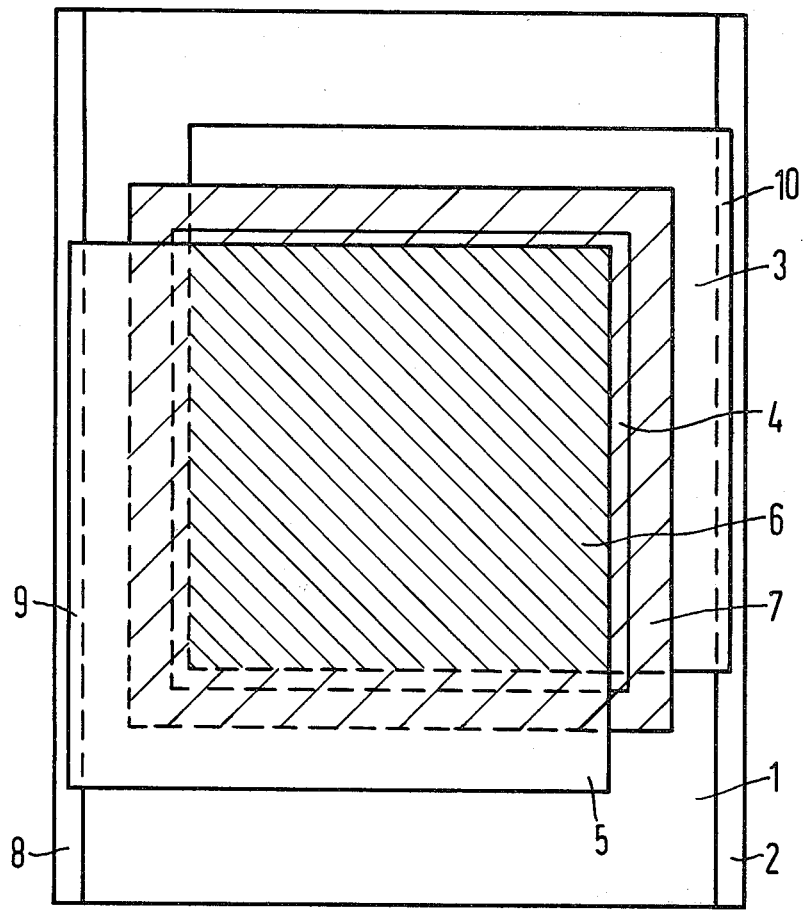
FIG. 1 schematically illustrates an inventive capacitor.
Figure 2:
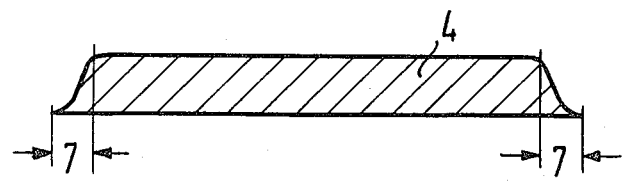
FIG. 2 schematically illustrates the cross-section through the dielectric layer of FIG. 1.

Contact strips 2 and 8 are materially bonded to a substrate 1 of a capacitor. A first metal layer 3 is applied to the substrate and overlaps the contact strip 2. A glow polymerization (gas discharge) layer 4 is applied to this metal layer 3. The glow polymerization (gas discharge) layer 4 is offset with respect to the first metal layer 3 in a direction which is parallel to none of the edges of the metal layer 3. A second metal layer 5 is applied to this glow polymerization layer 4. This is likewise offset in parallel with respect to the glow polymerization layer 4 in a direction which is parallel to none of the edges of the glow polymerization layer 4. In the example illustrated, the displacement ensued in the direction of a diagonal through the quadratically designed layers 3 through 5. The glow polymerization layer 4 illustrated with shading exhibits marginal zones 7 in which its thickness greatly decreases and finally approaches zero. These marginal zones, for example, arise upon application of the glow polymerization layer in diaphragm apertures. The parts of the glow polymerization layer 4 illustrated with broad shading and lying outside of the capacitively effective area 6 of the capacitor indicated with narrow shading are broader than the marginal zone 7 of the glow polymerization layer 4. By so doing, the full dielectric thickness and, thus, the full dielectric strength is guaranteed in the capacitively effective area.

The second metal layer 6 overlaps the second contact strip 8 along an edge which forms a strip-like contact area 9. The first metal layer 3 forms a corresponding strip-like contact area 10 in the region of its overlap with the first contact strip 2.

The non-capacitively effective parts of the coatings generated by means of the diagonal displacement of the individual layers with respect to one another are significantly smaller than the non-capacitively effective strips to be created in a displacement which is parallel to the non-contacted edges of the coatings. These are generated by means of flashovers and regenerating blow-outs in the area of the marginal zone when the capacitors are fused.

When the capacitors are fused, a voltage extending beyond the nominal voltage which is suitable for burning out the short circuits is applied between the coatings. By so doing, serrated strips are burned out whose width must be greater than the sharply limited strips of the arrangements of this invention.

Moreover, the contact strips are of necessity relatively greatly loaded by means of the fusing. This load is significantly reduced by means of the invention.

As a rule, the glow polymerization layers 4 are significantly thicker than the metal layers 3 or, respectively, 5. Thus, the area covered by the glow polymerization layers 4 rises above its environment. In the capacitively effective area, a further elevation arises due to the metal layers which are all present there. Nonetheless, in order to be able to displace the diaphragm in the manufacture of the capacitors without thereby damaging the layers already applied, the aperture is lifted by a certain amount before displacement. This amount is greater than the sum of the applied layers less the thickness of the metal layers of one polarity. Since the metal layers of one polarity only make up a small portion of the thickness of the layer packet, for the sake of simplicity the diaphragm is lifted by at least the sum of the thicknesses of all layers applied. This value can also be easily determined by measurement techniques.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method for the manufacture of a capacitor having a substrate with upper and lower metal layers with a glow polymerization layer therebetween and contact strips on the substrate, comprising the steps of: providing only one diaphragm with a parallelogram-shaped diaphragm aperture; placing the diaphragm on the substrate and producing the lower layer within the aperture such that it overlaps one of the contact strips; laterally displacing the same diaphragm with the aperture parallel to the substrate in a direction which is not parallel to any side edge of the aperture, placing said diaphragm directly in contact with the lower layer, and then forming the polymerization layer through the aperture such that a decreasing thickness marginal zone of the polymerization layer adjacent edges of the aperture results which approaches zero at the adjacent edges; and again lifting off the diaphragm upwardly to clear the polymerization layer without damaging the same, laterally displacing the aperture of the same diaphragm parallel to the substrate in a direction which is not parallel to any side edge of the aperture, and then forming the upper layer through the aperture of said same diaphragm such that it overlaps the other contact strip, whereby through use of the same diaphragm placed in contact with the substrate or lower and upper layers, in a simplified manner layers of equal coverage are insured in a glow polymerization dielectric type capacitor.

* * * * *